United States Patent [19]

Richter et al.

[11] Patent Number: 4,790,007
[45] Date of Patent: Dec. 6, 1988

[54] TELEPHONE INSTRUMENT

[75] Inventors: Ludwig Richter, Heusenstamm; Karl H. Niederhofer, Frankfurt; Dieter Kramer, Idstein; Gerhard Sussner, Meerholz; Wolfgang Girscher; Volker Munch, both of Frankfurt; Heinrich Vial, Eschborn; Helmut R. Mayer, Frankfurt; Hayo Reyher, Bad Nauheim, all of Fed. Rep. of Germany

[73] Assignee: Telenorma Telefonbau und Normalzeit GmbH, Fed. Rep. of Germany

[21] Appl. No.: 6,938

[22] Filed: Jan. 23, 1987

[30] Foreign Application Priority Data

Jan. 25, 1986 [DE] Fed. Rep. of Germany ....... 3602271
Mar. 8, 1986 [DE] Fed. Rep. of Germany ....... 3607727

[51] Int. Cl.⁴ .............................................. H04M 1/02
[52] U.S. Cl. .................................... 379/420; 379/435; 379/436
[58] Field of Search ....................... D14/52, 53, 56, 60, D14/61, 62, 63, 64, 65, 66; 379/368, 369, 370, 419, 420, 428, 429, 432, 433, 434, 435, 436, 440, 454, 455; 340/365 R, 365 VL

[56] References Cited

U.S. PATENT DOCUMENTS

| D. 272,441 | 1/1984 | Carr .......................... D14/59 X |
| D. 288,319 | 2/1987 | Suzuki ....................... D14/53 X |
| D. 294,351 | 2/1988 | Richter et al. ............. D14/59 |
| 4,153,822 | 5/1979 | Ueda et al. ................ 379/370 X |
| 4,277,652 | 7/1981 | Branden et al. .......... 379/429 |
| 4,375,584 | 3/1983 | Muzumdar ............... 379/428 |
| 4,381,500 | 4/1983 | Urata et al. ............... 379/368 X |
| 4,598,175 | 7/1986 | Read ......................... 379/435 |

FOREIGN PATENT DOCUMENTS

| 2326283 | 12/1974 | Fed. Rep. of Germany . |
| 2364386 | 7/1975 | Fed. Rep. of Germany . |
| 2902052 | 7/1980 | Fed. Rep. of Germany ...... 379/429 |
| 8108056 | 3/1982 | Fed. Rep. of Germany . |
| 3048765 | 7/1982 | Fed. Rep. of Germany ...... 379/429 |
| 8309660 | 8/1983 | Fed. Rep. of Germany . |
| 3210111 | 10/1983 | Fed. Rep. of Germany . |
| 3313146 | 10/1984 | Fed. Rep. of Germany . |
| 8507560 | 6/1985 | Fed. Rep. of Germany . |
| 3406881 | 9/1985 | Fed. Rep. of Germany . |
| 0052148 | 3/1985 | Japan ................................. 379/454 |

OTHER PUBLICATIONS

"Ultradial 120", Tele-Product News, May/Jun. 1985, p. 51.
German Publication; Unterrichtsblatter der Deutschen Bundes Post 36, (1983) Nr. 11, p. 443.

Primary Examiner—Jin F. Ng
Assistant Examiner—Randall S. Vaas
Attorney, Agent, or Firm—Steele, Gould & Fried

[57] ABSTRACT

A telephone instrument is designed in the shape of an angle, whereby the upper side has a steeper inclination towards the user. The rear wall is at approximately a right angle to the upper side. The bottom side runs at a specific distance, parallel to the upper side and to the rear wall. Since the distance between the upper side and the bottom side is not very great, i.e. since a maximum of only two printed circuit boards can be accommodated one on top of the other in this space, the bottom side below the upper side has a trough which serves both to accommodate an additional printed circuit board and to provide cable entries. This trough does not extend over the total width of the telephone instrument but is narrower. In order to expand the keyboard, one part of the upper side can be moved in the longitudinal direction, away from the user, so that an additional keyboard or indicator device below it is made available.

9 Claims, 6 Drawing Sheets

TELEPHONE INSTRUMENT

BACKGROUND OF THE INVENTION

1. Field of the Invention

The invention concerns a telephone instrument (i.e., a telephone set) with a dialing key set and possibly a service key set, an indicator device located above these, possibly a device for loudspeaker and/or hands-off listening with a volume adjustment device, and a hand set which can be accommodated in a cradle with two depressions located on the upper side, to the side of the key set or key sets, parallel to the longitudinal axis, whereby the housing of the telephone instrument is formed by an upper side, one side surface on each side, one rear wall, and one bottom side.

2. Prior Art

In known telephone instruments of this nature, the upper side, which accommodates the dialing and service key sets has only a slight inclination (10°) to the support surface of the telephone instrument, so that the indicator device must be accomodated at a steeper angle for purposes of improved readability (German Disclosure Document, DE-OS No. 34 06 881). As long as the keys proper are lettered, the readibility of the lettering is not reduced by the slight angle of the upper side of the telephone instrument; difficulties in reading occur when text strips are accommodated between or beside the keys. However, the slight inclination of the surface in combination with the usually low height of the telephone instrument housing has the advantage that the instrument can be easily lifted with one hand, whereby the hand set is simultaneously pressed against the upper side by the hand.

German Patent DE-PS No. 32 10 111 also discloses a telephone instrument for use as a table or wall instrument, on which the upper side accommodating the key sets has a stronger inclination toward the user. As already mentioned, better readability of the key lettering and the indicator device is provided in this case; however, the disadvantage of a telephone instrument of this nature is that it can no longer be lifted with one hand.

SUMMARY OF THE INVENTION

The purpose of the invention is to indicate a telephone instrument where, on one hand, good readibility of the key lettering is given and, on the other other hand, this instrument can also easily be lifted with one hand.

This problem is solved thereby that the telephone instrument is designed with an angular shape, whereby the upper side is inclined to the support surface of the telephone instrument at an angle greater then 20° and lesser than 45°, and thereby that the rear wall is arranged at an angle to the upper side of 80°–100°, and that the bottom side is parallel to the upper side and to the rear wall.

Consequently, the telephone instrument has a housing shape with an L-shaped cross section, whereby it rests on the support surface with the two ends of the angle legs. The distance between the bottom side of the instrument housing and the upper side of the hand set can thereby be selected so that it can easily be grasped with the hand, whereby it is easily possible to lift the telephone instrument with one hand. Good readability of the key lettering and the indicator device is achieved by means of the steeper inclination of the upper side towards the user.

A further development of the invention consists therein that the space between the upper side and the bottom side accommodates the electrical and electronic components of the basic equipment, while additional equipment can be inserted into the space between the rear wall and the bottom side through corresponding openings in the rear wall.

Due to the particular design of the telephone instrument housing, a grip depression in the rear wall for lifting the telephone instrument can be eliminated, so that this space remains available for additional equipment, whereby the telephone instrument can easily be modified for various user purposes.

A further development of the invention consists therein that a trough is provided on that part of the bottom side which parallel to the upper side, reaching to that part of the bottom side which is parallel to the rear wall, and is narrower than the width of the telephone instrument. If the telephone instrument is correspondingly wide, a sufficiently large trough can be provided on the bottom side to accommodate additional devices, e.g. an additional printed circuit board.

Another further development of the invention consists therein that the side of the trough is provided with cable entries.

In this manner, cable exit (connecting cord, hand set connection cord, etc.) is possible on the side, below the bottom side of the telephone instrument.

Another further development of the invention consists therein that the dialing keys and possibly also the service keys in combination with the indicator device is/are accommodated on a sliding part which is flush with the upper side and which can be moved from a first position into a second position, and that in the second position, an additional keyboard becomes available which is located underneath it, e.g. an alpha-numerical input keyboard, targetet dialing keys, etc. or an indicator device.

In this manner, the keyboard can be expanded without necessitating a corresponding enlargement of the upper side.

Another further development of the invention consists therein that the upper portion of the rear wall constitutes part of the sliding part. By means of such a design of the sliding part it is possible to integrate it with a badge reader and/or a printer. Additional advantages are revealed in the sub-claims.

BRIEF DESCRIPTION OF THE DRAWINGS

The invention is explained in greater detail with reference to an execution example which is represented in the drawing.

The following is shown.

DETAILED DESCRIPTION OF THE PREFERRED EMBODIMENTS

Figure 1:
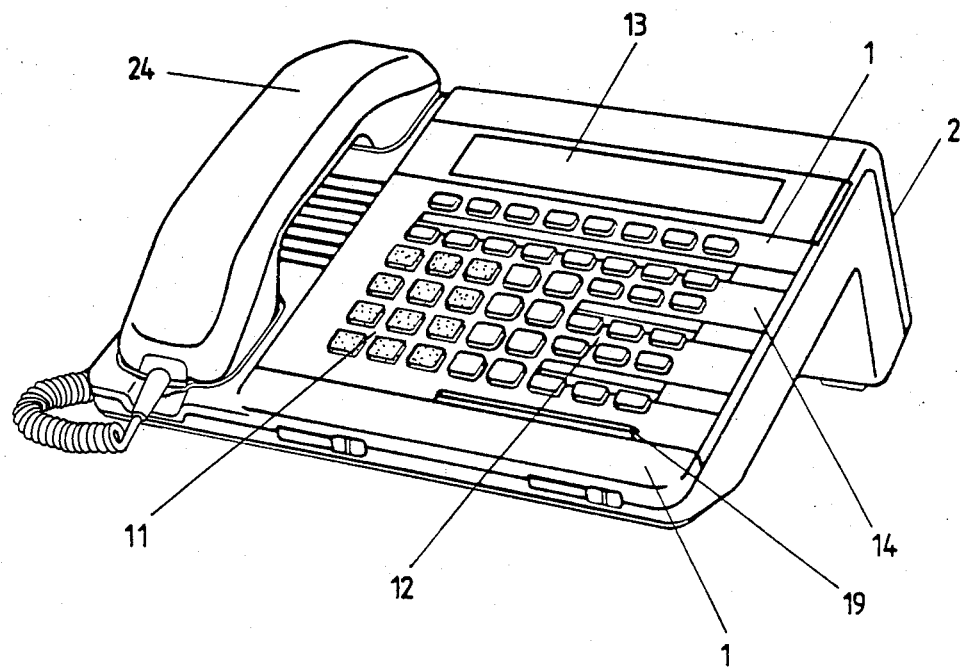
FIG. 1 a perspective front view of the telephone instrument.

The telephone instrument with angular shape has an upper side 1, which is inclined to the support surface at an angle greater than 20° but lesser than 45° (FIG. 1). The rear wall 2 is at an angle of 80° to 100° to the upper side. The bottom side 4 runs parallel to the upper side 1 and to the rear wall 2, whereby an L-shaped cross section of the instrument housing results. One part of the upper side 1, namely that portion which accommodates the dialing keys 11, the service keys 12, and the indicator device 13, is developed as a sliding part 14, which can be pushed longitudinally towards the rear. The movement is achieved via the grip bar 19. The activation devices 10 for adjustment of volume of the loudspeaker device, for adjustment of the volume of the calling process, for adjustment of the brightness of the indicator device, etc. The hand set 24 rests in matching cradle depressions on the left side of the housing.

Electroacoustical transformers for the calling component and/or loudspeaker or hands off speaking devices can be accommodated below the hand set handle. The upper side 1 has identification strips 46 which are inserted in swallow-tail slots so that they can be pulled out towards the side.

Figure 2:
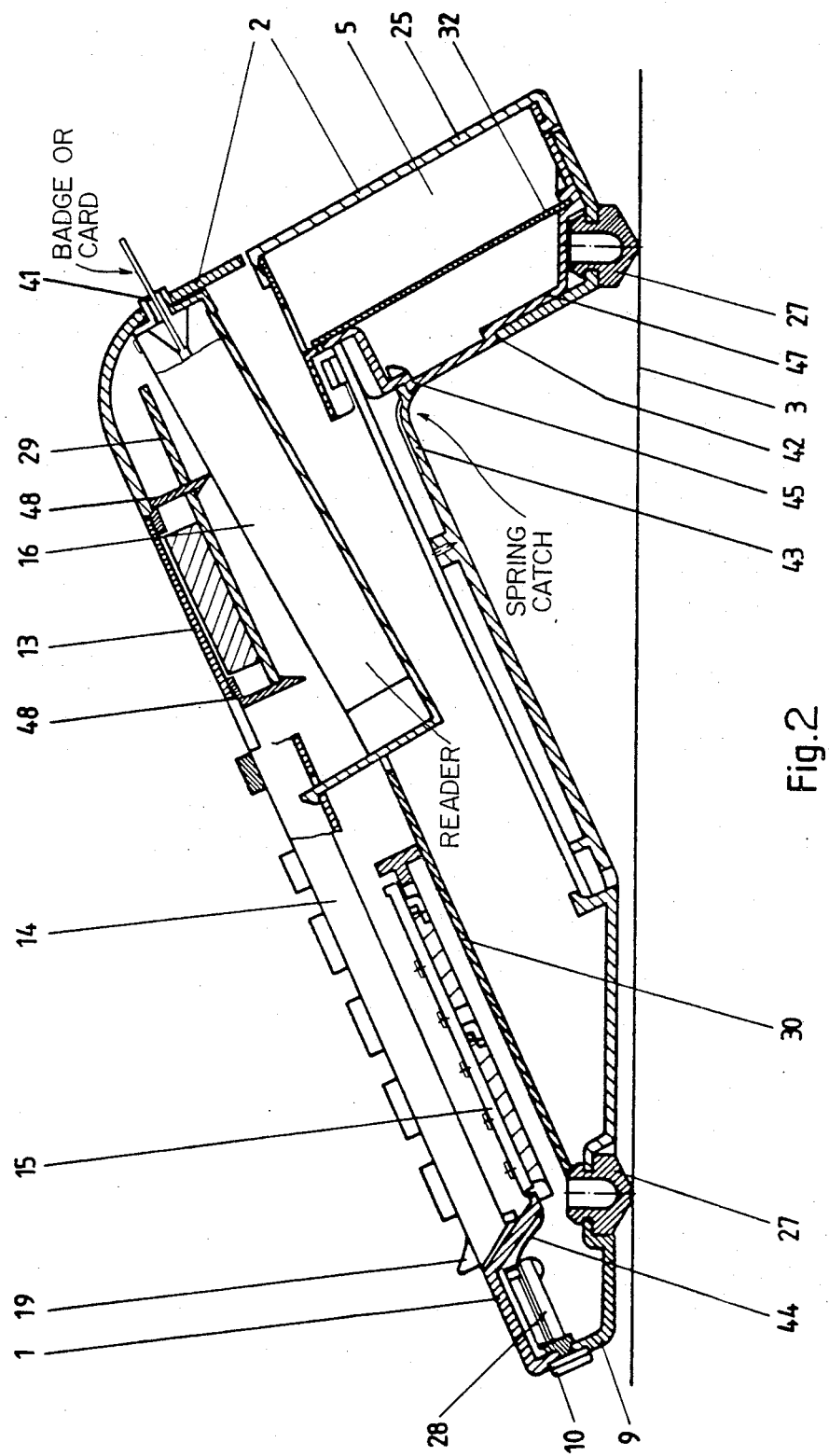
FIG. 2 a section through the first third of the telephone instrument housing.

FIG. 2 shows a longitudinal section through the housing in its right hand portion. The housing rests with rubber feet 27 on the support surface 3. The rear wall 2 has openings 5, which can be closed by means of covers 25. Module housings containing printed circuit boards 32 for additional which can be inserted into the opening 5. Each module housing 47 has a projection 45 which fits into a corresponding opening 42 in that part of the bottom side 4 which is parallel to the rear wall 2. Further, each module housing 47 has an opening into which the spring-loaded lock-in catch 43 engages which is located on that bottom side 4 which is adjacent to the upper side 1. The module 47 can be released by pressure on that part of the bottom side 4 which is parallel to the upper side 1, in the area of the spring-loaded lock-in catch 43.

Part of the upper side 1 in combination with the portion of the rear wall 2 above the cover 25 is designed as a sliding part 14, which can be moved to the right, parallel to the upper side 1, by means of the grip bar 19 according to the represented view. The sliding part 14 contains a key-board, an indicator device 13 with related printed circuit board 29 and a badge or card reader 16, into which a badge or card can be inserted through the opening 41 in the rear wall 2. This portion of the rear wall constitutes part of the sliding part 14. Means of activation are accommodated on the front face 9, by which means potentiometers 28 in the interior of the housing can be adjusted. These potentiometers may be designed e.g. as slide potentiometers. If the keyboard 15 is designed as a foil (touch sensitive) keyboard, the foils 44 can be accordingly lengthened and part of the potentiometer proper may be accommodated on the extension.

The printed circuit board 29 supporting the indicator device 13 is held in place by means of lock-in catches 48 in the interior of the housing below the upper side 1.

Figure 3:
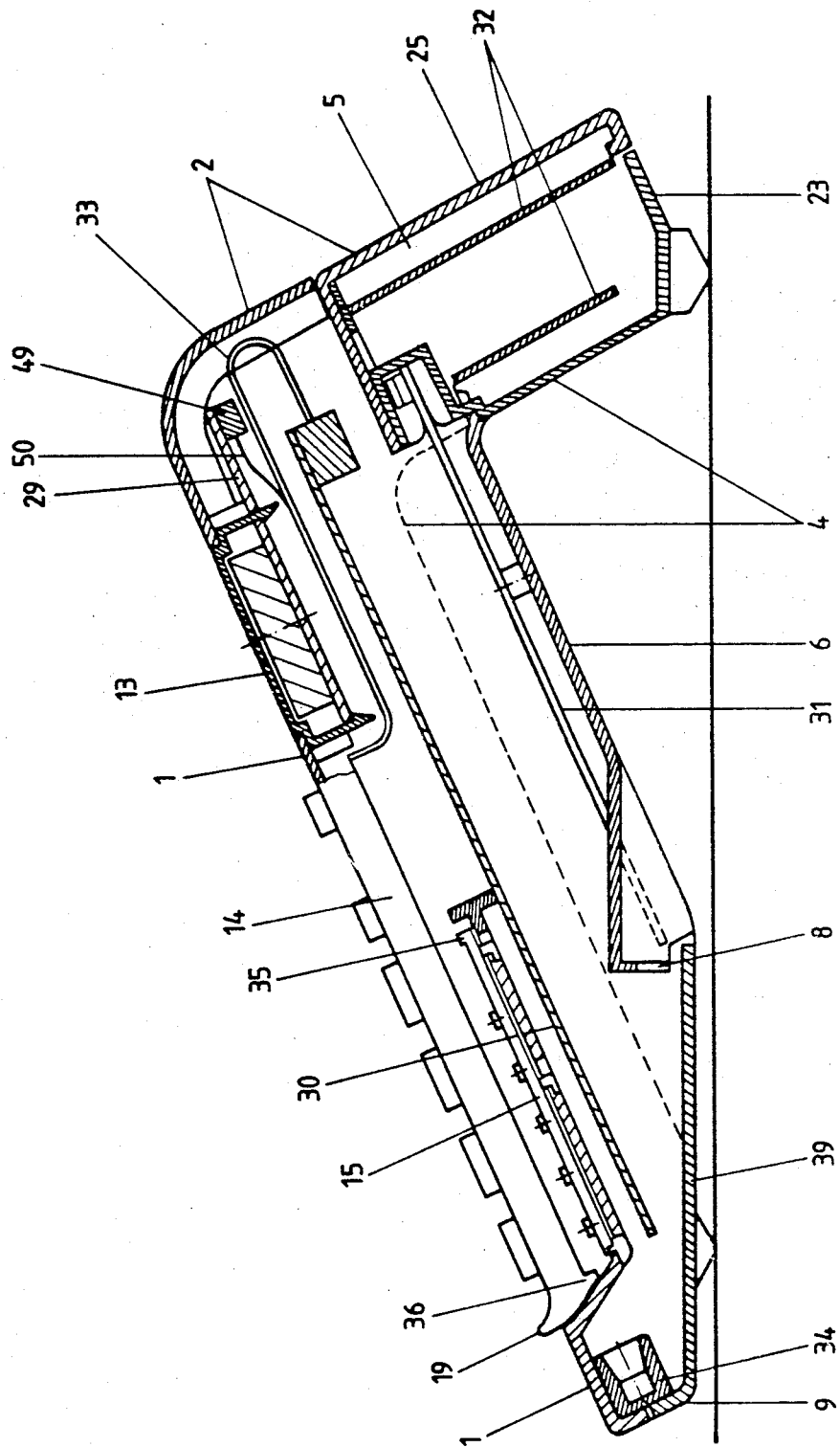
FIG. 3 a section through the second third of the telephone instrument housing.

FIG. 3 shows a longitudinal section through the center third of the instrument housing. On that part of the bottom side 4 which is parallel to the upper side 1, a trough 6 has been arranged which extends to that part of the bottom side 4 which is parallel to the rear wall 2. This trough is narrower than the width of the telephone instrument. The trough serves e.g. to accommodate an additional printed circuit board 31. The bottom side 4 that is parallel to the upper side 1 and the trough 6 are compressed in the direction towards the front surface 9, namely in such a manner that the area 39 is parallel to the support surface 3. The trough 6 has cable entries 8 running parallel to the support surface 3 in longitudinal direction. The cables can be brought towards the rear in longitudinal direction parallel to the support surface with the aid of cable holders—not shown—installed in the vicinity of the support 23 in the space between the rear wall 2 and the bottom side 4. The front face 9, which runs parallel to the rear wall 2, is provided with corresponding sound entry ports, behind which there is a microphone 34 for the hands off device.

On its bottom side, in the vicinity of the grip bar 19, the sliding part 14 has a transversal bar 36, which is held in the defined second position of the sliding part by means of a stop—not shown—and is flush with the transversal bar 35 which is attached to the keyboard 15 below the sliding part (see FIG. 5). A flexible flat cable or a correspondingly laid out flexible printed circuit board 33 with corresponding circuits serves to electrically connect the sliding part 14 and the fixed portion of the housing, resp. the printed circuit board 34. If the keyboard of the sliding part is designed as a foil (touch sensitive) keyboard, the foil thereof can be correspondingly lengthened so that this foil proper constitutes the printed circuit board 33. In addition, the foil of the (touch sensitive) keyboard can itself be used by means of appropriate design, i.e. the connecting foil 50 to the electrical connection of the indicator device 13, namely thereby that this is connected with the connector portion 49 of the printed circuit board 29. As already stated, modules for accommodating additional devices may be inserted into the spaces 5 which can also contain several printed circuit boards 32 and which, when not in use, can be closed by covers 25 in the rear wall 2.

Figure 4:
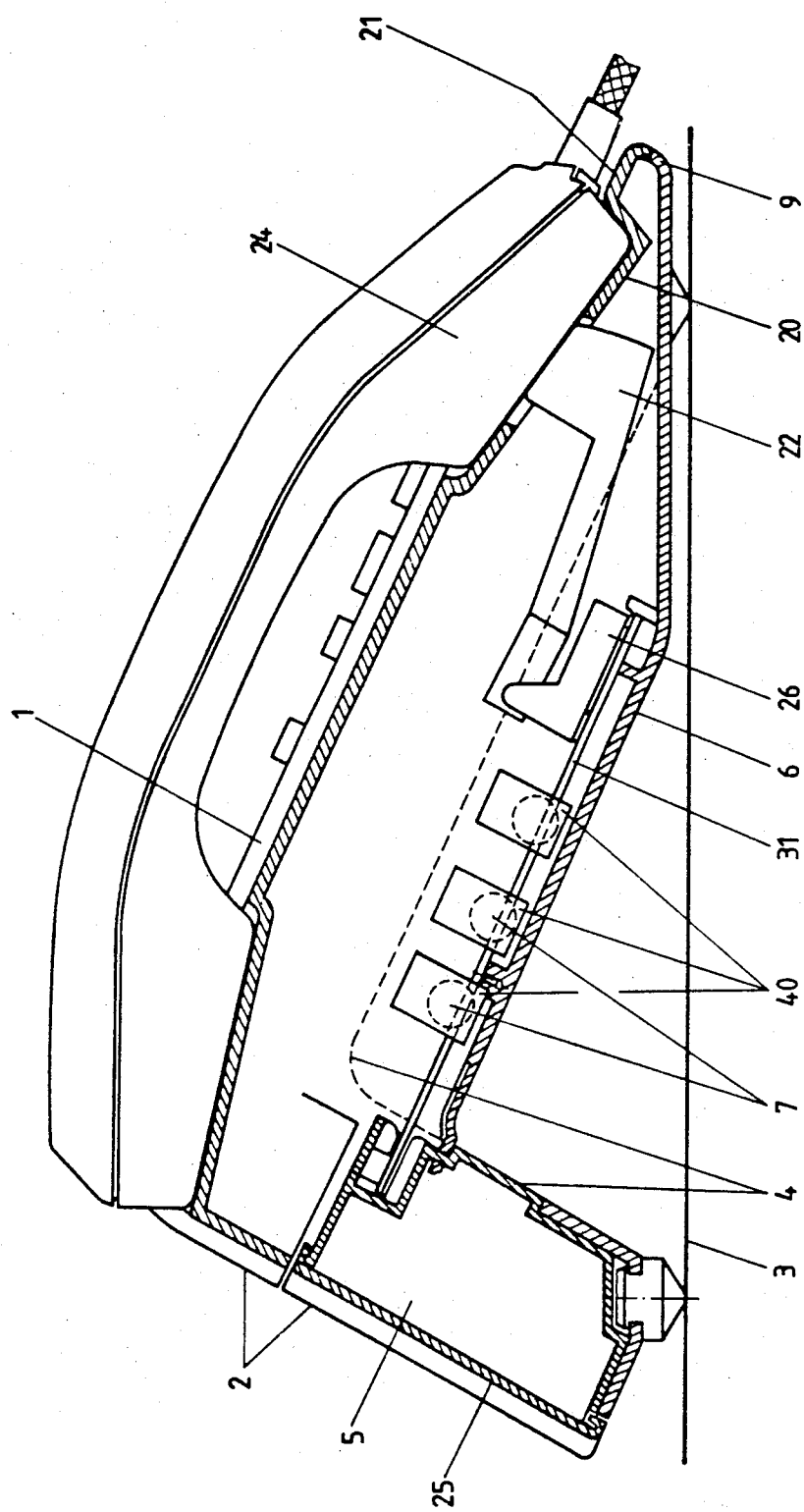
FIG. 4 a section through the housing at the level of the hand set cradle.

FIG. 4 shows a longitudinal section on the level of the hand set cradle. The hand set 24 rests in two depressions on the upper side 1, whereby the depression 20 is separated from the front face 9 by means of a beading 21. The nose 22 of the activation lever for the off hook switch projects through the cradle depression 20. Connection elements 40 are attached to the printed circuit board 31, accommodated in the trough 6, to which elements cables are connected, led through the openings 7 on the side of the trough 6, which openings are shown by means of the dashed line. These cables serve to connect the extension circuits, to connect additional equipment outside the telephone instrument, and to connect the connecting cord of the hand set 24.

Figure 5:
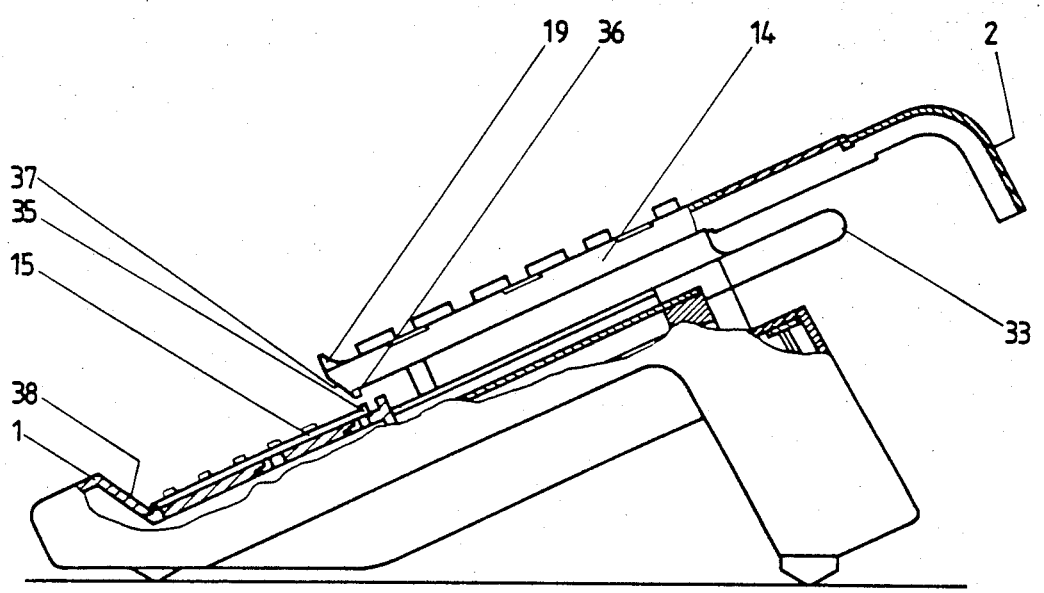
FIG. 5 a section through the telephone instrument housing with the sliding part in the second position, and FIG. 6 a perspective view of the telephone instrument from the rear.

FIG. 5 shows a side view with partial section of the sliding part 14 in the second position. The front edge 37 of the sliding part 14 below the grip bar 19 is adjusted to the chamfer 38 which is located between the upper side 1 and the keyboard 15. In this position, the two transversal bars 35 and 36 are located one above the other.

Both in the idle position and in the second position which makes the key-board 15 available, the sliding part 14 can activate a switch which can serve to alter the functions of the keyboard of the sliding part 14 and/or the indicator device of the sliding part. The keyboard 15 may be designed as an alpha-numerical input keyboard or a targeted dialing key set. Further, an additional indicator device can also be installed instead of the keyboard 15. This may serve as a bank of lamps indicating lines in use, or as an indicator device expansion of the indicator device of the sliding part 14, whereby the switching is achieved via the previously mentioned switch.

Figure 6:
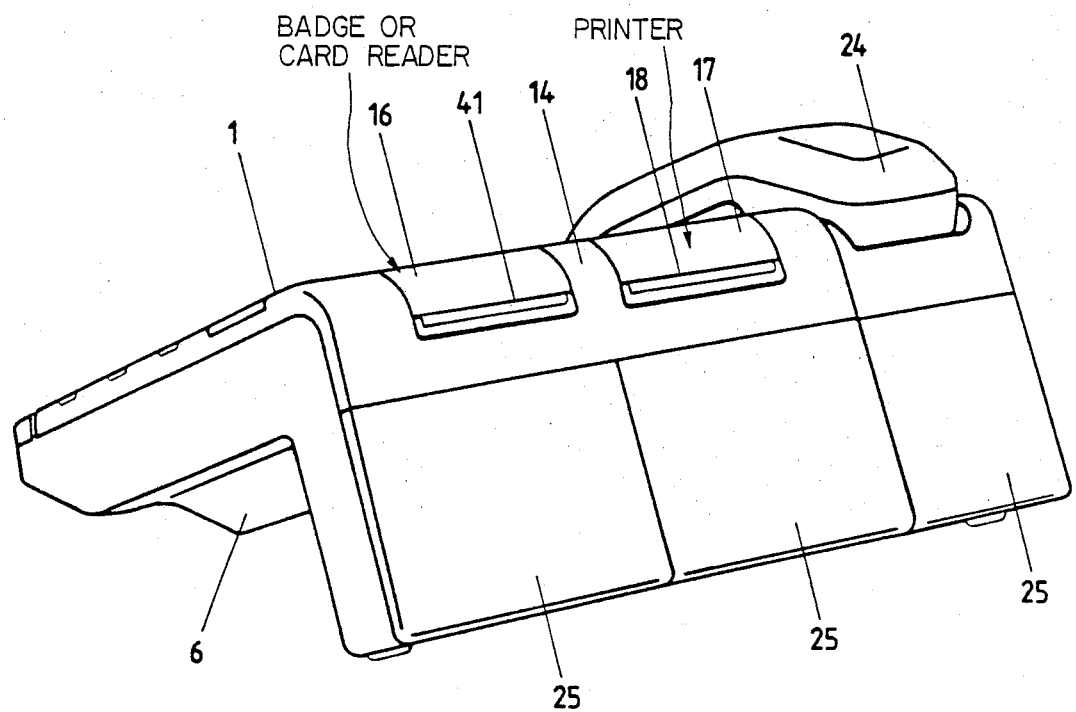

A badge reader 16 or a printer 17 can be installed in the sliding part 14 (FIG. 6), whereby the output slot 18 of the printer or the slot 41 for the badge reader are accommodated in the rear wall, namely parallel to the upper side 1. The fixed portion of the rear wall has one or several openings 5—not shown—which can be closed by means of covers 25. As already mentioned, additional equipment such as e.g. automatic answering machines, modems, particularly interfaces in the form of modules, can be installed in these opening, whereby the installed module as well as a cover 25 closes the rear wall. In the representation in FIG. 6, it is also apparent that the width of the trough 6 is lesser than the width of the telephone instrument.

Since the electrical and electronic components of the basic equipment are accommodated in the space between the bottom side 4 and the upper side 1, and additional equipment in the form of modules can be installed in the space between the rear wall 2 and the bottom side 4, a telephone instrument of this nature can be modified for a great number of user purposes. Thus, the telephone instrument according to the invention can be used as a multifunctional terminal, "convenience telephone", switchboard, etc. Thereby, the keyboard 15 and/or the indicator device can be assigned such functions as are not frequently required, so that the sliding part 14, which can be locked into both its position, can remain in its idle position for the greater part of the time the telephone instrument is used.

We claim:
1. A telephone instrument adapted to rest on a support surface, comprising:
    a housing, the housing of the telephone instrument being formed by an upper side, one side surface on each side, one rear wall, and one bottom side and being substantially L-shaped in cross-section taken along a longitudinal axis of the telephone instrument;
    at least one of a dialing key set and a service key set;
    an indicator device installed above said dialing key set;
    a speaker device with an adjustment device for volume;
    a handset;
    cradle depressions on said upper side adapted to retain said handset next to the key set and the indicator device, parallel to the longitudinal axis of said telephone instrument; and,
    the upper side being inclined at an angle of more than 20 degrees and less than 45 degrees to the support surface, said rear wall being inclined at an angle of more than 80 degrees and less than 100 degrees to said upper side, said bottom side having a portion substantially parallel to said upper side and a portion substantially parallel to said rear wall, a distance between the upper side and the bottom side being substantially equal to a distance between the rear wall and the bottom side, a space between the upper side and the bottom side being adapted to receive electrical and electronic components forming basic equipment of the telephone instrument including at least one printed circuit board, said at least one printed circuit board being installed substantially parallel to said upper side;
    at least one of the dialing key set, the service key set, and the indicator device being accommodated on a sliding part flush with the upper side, which sliding part can be moved from a first position into a second position, said sliding part in the second position exposing at least one additional keyboard located underneath it, and an indicator device, an upper portion of the rear wall forming a part of the sliding part, a badge reader being installed in the sliding part, said sliding part comprising a slot adapted for insertion of badge means and located in the upper portion of the rear wall, the slot being parallel to the upper side, and a printer, said printer being installed in the sliding part, said sliding part further comprising an output slot in the upper portion of the rear wall and parallel to the upper side.

2. A telephone insstrument adapted to rest on a support surface, comprising:
    a housing, the housing of the telephone instrument being formed by an upper side, one side surface on each side, one rear wall, and one bottom side and being substantially L-shaped in cross-section taken along a longitudinal axis;
    at least one of a dialing key set and a service key set;
    an indicator device installed above said dialing key set;
    a speaker device with an adjustment device for volume;
    a handset;
    cradle depressions on said upper side adapted to retain said handset next to the key set and the indicator device, parallel to a longitudinal axis of said telephone instrument; and,
    the upper side being inclined at an angle of more than 20 degrees and less than 45 degrees to the support surface, said rear wall being inclined at an angle of more than 80 degrees and less than 100 degrees to said upper side, said bottom side having a portion substantially parallel to said upper side and a portion substantially parallel to said rear wall, the distance between the upper side and the bottom side being substantially equal to a distance between the rear wall and the bottom side, the space between the upper side and the bottom side being adapted to receive the electrical and electronic components of the basic equipment of the telephone instrument including at least one printed circuit board, said at least one printed circuit board installed substantially parallel to said upper side;
    openings in said rear wall, said openings being adapted to receive additional equipment installed between the rear wall and the bottom side;
    the additional equipment being in the form of modules, said modules being accommodated in closed housings, said closed housings being flush with the rear wall when installed in the telephone instrument, each one of the module housings having a projection on a side thereof facing away from the rear wall, which projection fits into a corresponding opening in the portion of the bottom side parallel to the rear wall, the portion of the bottom side parallel to the upper side having at least one spring-loaded lock-in catch adapted to engage the module housings.

3. A telephone set adapted for placement on a surface, comprising:
    a housing formed by an upper side, two lateral sides, a rear wall and a bottom side;

at least one of a dialing keyset, a service keyset, an indicator device, a speaker device, a handset, and cradle means for retaining said handset;

said housing being substantially L-shaped in a longitudinal cross-section, said upper side being inclined at an angle of more than 20 degrees and less than 45 degrees to said support surface, said rear wall being at an angle of between 80 degrees and 100 degrees to said upper side, said bottom side having a portion substantially parallel to said upper side and a portion substantially parallel to said rear wall, the space between the bottom side and the upper side being occupied by at least one printed circuit board installed substantially parallel to said upper side and comprising electrical and electronic components for basic functions of the telephone instrument; and, at least one module housing between said rear wall and said bottom side, said at least one module housing being accessed by at least one opening in said rear wall.

4. The telephone set of claim 3, wherein said bottom side opposite said upper side comprises a trough, said trough being narrower in width than said bottom side, and said trough being adapted to contain a printed circuit board.

5. The telephone set of claim 4, further comprising cable entry means in said trough.

6. The telephone set of claim 3, wherein a portion of said bottom side adjacent to said support surface is substantially parallel to said support surface.

7. The telephone set of claim 3, wherein said telephone set comprises a speaker device, and further comprising a front face between said upper side and said bottom side, said front face being substantially parallel to the rear wall, said front face comprising an adjustment device for the volume of said speaker device and being adapted to receive additional adjustment devices.

8. The telephone set of claim 7, further comprising microphone means, said microphone means being positioned behind said front face, a portion of said front face most nearly adjacent said microphone means having at least one opening to permit the passage of sound waves to said microphone.

9. The telephone set of claim 3, further comprising structure for mounting said instrument to a wall.

* * * * *

UNITED STATES PATENT AND TRADEMARK OFFICE
CERTIFICATE OF CORRECTION

PATENT NO. : 4,790,007
DATED : December 6, 1988
INVENTOR(S) : Ludwig Richter, et al.

It is certified that error appears in the above-identified patent and that said Letters Patent is hereby corrected as shown below:

Column 3, line 32 before "which" insert --devices--.

Column 6, line 17 delete "insstrument" and insert --instrument--.

Signed and Sealed this

Sixteenth Day of July, 1991

Attest:

HARRY F. MANBECK, JR.

Attesting Officer

Commissioner of Patents and Trademarks